US011067722B2

(12) United States Patent
Abe et al.

(10) Patent No.: US 11,067,722 B2
(45) Date of Patent: Jul. 20, 2021

(54) OPTICAL ELEMENT AND METHOD OF PRODUCING OPTICAL ELEMENT

(71) Applicant: CANON KABUSHIKI KAISHA, Tokyo (JP)

(72) Inventors: Keiko Abe, Kawasaki (JP); Tomonari Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

(21) Appl. No.: 16/097,198

(22) PCT Filed: Apr. 13, 2017

(86) PCT No.: PCT/JP2017/015141
§ 371 (c)(1),
(2) Date: Oct. 26, 2018

(87) PCT Pub. No.: WO2017/188010
PCT Pub. Date: Nov. 2, 2017

(65) Prior Publication Data

US 2019/0137662 A1 May 9, 2019

(30) Foreign Application Priority Data

Apr. 28, 2016 (JP) ............................ JP2016-091575

(51) Int. Cl.
*G02B 1/111* (2015.01)
*G02B 1/14* (2015.01)
(Continued)

(52) U.S. Cl.
CPC .......... *G02B 1/14* (2015.01); *B29D 11/00865* (2013.01); *B29D 11/00923* (2013.01);
(Continued)

(58) Field of Classification Search
CPC . G02B 5/04; G02B 5/005; G02B 1/11; G02B 1/14; G02B 1/12; G02B 1/18; G02B 1/10; G02B 1/113; G02B 5/003; G02B 27/0018; B24B 13/0055; B29D 11/00865; B29D 11/00923; C03C 17/32; C03C 2217/73; C03C 2217/78; C03C 2218/32;
(Continued)

(56) References Cited

U.S. PATENT DOCUMENTS 3,420,733 A 1/1969 Ochi et al.
4,196,109 A 4/1980 Garis et al.
(Continued)

FOREIGN PATENT DOCUMENTS

EP 0882747 A2 12/1998
JP 2010-054827 A 3/2010

*Primary Examiner* — Evelyn A Lester
(74) *Attorney, Agent, or Firm* — Canon U.S.A., Inc., IP Division

(57) ABSTRACT

The present invention relates to an optical element including a base material, a light-shielding film, and a cured film in which an alkyd resin and a melamine resin having two or more iminomethylol groups in a molecule are condensed or in which an alkyd resin and a benzoguanamine resin having two or more iminomethylol groups in a molecule are condensed. The light-shielding film is disposed in at least a part of the periphery of the base material. The cured film is disposed on the surface of the light-shielding film.

13 Claims, 2 Drawing Sheets

1
2a
2b
2
5
2c
3
4

(51) Int. Cl.

| | |
|---|---|
| ***G02B 5/00*** | (2006.01) |
| ***G02B 27/00*** | (2006.01) |
| ***C09D 5/32*** | (2006.01) |
| ***G02B 1/10*** | (2015.01) |
| ***C09D 5/00*** | (2006.01) |
| ***B29D 11/00*** | (2006.01) |
| ***C03C 17/32*** | (2006.01) |
| ***C09D 167/08*** | (2006.01) |
| ***G02B 1/11*** | (2015.01) |
| *G02B 1/113* | (2015.01) |
| *G02B 1/18* | (2015.01) |
| *G02B 1/12* | (2006.01) |
| *B24B 13/005* | (2006.01) |

(52) U.S. Cl.

CPC ................ *C03C 17/32* (2013.01); *C09D 5/00* (2013.01); *C09D 5/006* (2013.01); *C09D 5/32* (2013.01); *C09D 167/08* (2013.01); *G02B 1/10* (2013.01); *G02B 1/11* (2013.01); *G02B 5/003* (2013.01); *G02B 27/0018* (2013.01); *B24B 13/0055* (2013.01); *C03C 2217/73* (2013.01); *C03C 2217/78* (2013.01); *C03C 2218/32* (2013.01); *G02B 1/113* (2013.01); *G02B 1/12* (2013.01); *G02B 1/18* (2015.01); *G02B 5/005* (2013.01)

(58) Field of Classification Search

CPC . C09D 5/00; C09D 5/006; C09D 5/32; C09D 167/08

USPC ........ 359/642, 707, 737, 738, 831, 833–837

See application file for complete search history.

(56) References Cited

U.S. PATENT DOCUMENTS

| | | | | |
|---|---|---|---|---|
| 6,210,858 | B1 * | 4/2001 | Yasuda | B32B 7/02 430/270.1 |
| 2011/0176216 | A1 | 7/2011 | Kawauchi et al. | |
| 2013/0148205 | A1 * | 6/2013 | Kobayashi | G02B 1/111 359/601 |
| 2014/0016202 | A1 * | 1/2014 | Toshima | G02B 5/003 359/599 |
| 2014/0016203 | A1 * | 1/2014 | Toshima | G02B 5/0226 359/599 |

* cited by examiner

[Fig. 1]
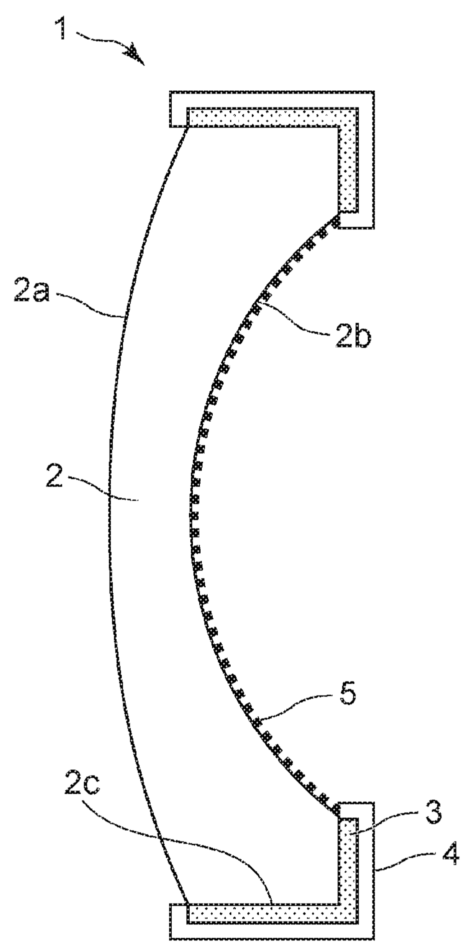

[Fig. 2A]
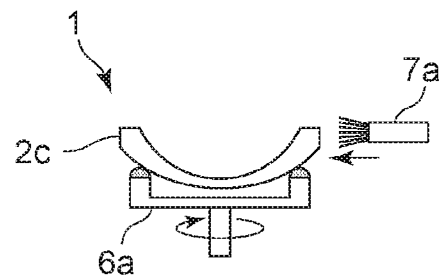
[Fig. 2B]
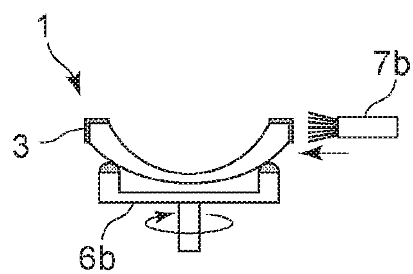
[Fig. 2C]
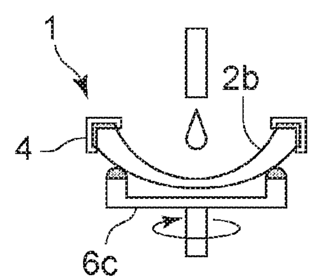
[Fig. 2D]
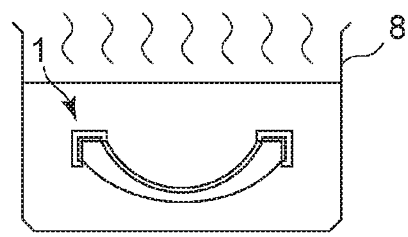
[Fig. 2E]
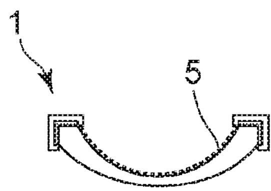

OPTICAL ELEMENT AND METHOD OF PRODUCING OPTICAL ELEMENT

TECHNICAL FIELD

The present invention relates to an optical element, such as a lens, and a method of producing an optical element.

BACKGROUND ART

In an optical element, such as an optical lens, a light-shielding film is disposed in the periphery of the optical element in order to prevent flare and ghost. In addition, in an optical element, such as an optical lens, an antireflection film is disposed in the optically effective area in order to reduce the reflection at the surface and also to remove the light scattered by reflection.

PTL 1 discloses an optical element, such as an optical lens, provided with a light-shielding film in the periphery thereof, a protective film on the light-shielding film, and also an antireflection film in the optically effective area of the optical element.

The protective film of the optical element disclosed in PTL 1 is required to be formed through curing by being fired at high temperature in order to prevent the light-shielding film from being deteriorated during the process of forming the antireflection film and by use for a long time under a high-temperature and high-humidity environment. However, the firing at high temperature also simultaneously applies a thermal load to the light-shielding film, resulting in deterioration of the color tone to reduce the appearance quality. If the protective film is fired at low temperature such that the appearance quality of the light-shielding film is not reduced, however, the characteristics of the protective film, such as solvent resistance and water resistance, cannot be maintained.

CITATION LIST

Patent Literature

PTL 1: Japanese Patent Laid-Open No. 2010-54827

SUMMARY OF INVENTION

Solution to Problem

The optical element of the present invention includes a base material and a light-shielding film disposed in at least a part of the periphery of the base material. On the surface of the light-shielding film, a film in which an alkyd resin and a melamine resin having two or more iminomethylol groups in a molecule are condensed or in which an alkyd resin and a benzoguanamine resin having two or more iminomethylol groups in a molecule are condensed is disposed.

The method of producing an optical element of the present invention includes a step of forming a light-shielding film by applying a light-shielding paint containing a colorant and a binder resin to a periphery of a base material and then firing the paint at 40° C. or more and 100° C. or less; a step of forming a protective film by applying a paint containing an alkyd resin and a melamine resin or benzoguanamine resin having two or more iminomethylol groups in a molecule to the surface of the light-shielding film and then firing the paint at 40° C. or more and 100° C. or less; and a step of forming an antireflection film by providing an antireflection film to the base material after the step of forming the protective film.

Further features of the present invention will become apparent from the following description of exemplary embodiments with reference to the attached drawings.

BRIEF DESCRIPTION OF DRAWINGS

FIG. 1 is a diagram illustrating an example of the optical element of the present invention.

FIG. 2A is a diagram illustrating a method of producing an optical element of an example.

FIG. 2B is a diagram illustrating the method of producing an optical element of the example.

FIG. 2C is a diagram illustrating the method of producing an optical element of the example.

FIG. 2D is a diagram illustrating the method of producing an optical element of the example.

FIG. 2E is a diagram illustrating the method of producing an optical element of the example.

DESCRIPTION OF EMBODIMENTS

Embodiments of the present invention will now be described.

The present invention provides an optical element including an antireflection film and capable of maintaining good appearance even if used for a long time under a high-temperature and high-humidity environment.

Optical Element

The optical element of the present invention can be used in optical equipment, such as a camera, binoculars, a microscope, and a semiconductor exposure apparatus. Specifically, the optical element of the present invention can be used as an element constituting optical equipment, such as a lens, a prism, a reflecting mirror, and a diffraction grating, in particular, a lens and a prism.

A case of using the optical element of the present invention as a lens will be described using FIG. 1. As shown in FIG. 1, the optical element 1 includes base material 2 having optically effective areas 2*a* and 2*h* and an optically non-effective area 2*c*. A light-shielding film 3 is disposed in at least a part of the optically non-effective area 2*c* in the periphery of the base material 2. A protective film 4 is disposed on the light-shielding film 3. The light-shielding film 3 is disposed in the periphery of the optical element for preventing occurrence of flare and ghost. The protective film 4 prevents the light-shielding film 3 from deteriorating in the step of forming an antireflection film and in use for a long time. The protective film 4 can be formed so as to cover the entire surface of the light-shielding film 3.

In the optical element 1 of the present invention, an antireflection film 5 is formed in a part of the optically effective areas 2*a* and 2*h*.

Base Material

The base material 2 of the optical element of the present invention can be, for example, a glass mirror, an optical lens, or a prism, in particular, an optical lens or a prism. The optical element of the present invention can be used in optical equipment, such as a camera, binoculars, a microscope, and a semiconductor exposure apparatus.

The base material 2 used in the present invention may have any shape as long as it corresponds to the final intended use and may have a shape having a two-dimensionally or three-dimensionally curved surface.

Light-Shielding Film

The light-shielding film 3 of the optical element of the present invention at least contains a colorant and a binder resin. The light-shielding film 3 may contain inorganic fine particles and other components.

The binder resin can be an epoxy resin. The content of the epoxy resin in the light-shielding film 3 is preferably 10 mass % or more and 60 mass % or less and more preferably 15 mass % or more and 30 mass % or less. A content of the epoxy resin of less than 10 mass % decreases the adhesion to the base material. A content of the epoxy resin of higher than 60 mass % deteriorates the optical characteristics.

The colorant used in the light-shielding film 3 can be a dye, a pigment, coal tar, or a mixture thereof. As the dye, azo dyes, anthraquinone dyes, phthalocyanine dyes, stilbenzene dyes, pyrazolone dyes, thiazole dyes, carbonium dyes, and azine dyes can be used. Among these dyes, the azo dyes can be particularly used. A dye containing a metal such as chromium, cobalt, or copper can increase the robustness, such as light resistance, water resistance, and heat resistance. The dye may be any material that absorbs visible light having a wavelength of 400 to 700 nm and is soluble in any solvent. The dye may be a single type or a mixture of several types of dyes, such as black, red, yellow, and blue dyes. The pigment may be any material that absorbs visible light having a wavelength of 400 to 700 nm. As the pigment, carbon black, titanium black, and iron oxides can be used. The pigment can have a number-average particle diameter of 5 nm or more and 200 nm or less. A number-average particle diameter of the pigment of smaller than 5 nm reduces the stability of the light-shielding paint. A number-average particle diameter of the pigment of larger than 200 nm increases the internal reflection of the light-shielding film containing such a pigment.

The content of the colorant in the light-shielding film 3 of the present invention is preferably 5.0 mass % or more and 30.0 mass % or less and more preferably 10.0 mass % or more and 15.0 mass % or less. A content of the colorant of less than 5.0 mass % increases the internal reflection. A content of the colorant of higher than 30.0 mass % decreases the solvent resistance.

The light-shielding film 3 of the present invention may contain inorganic fine particles for adjusting the index of refraction. The difference of the index refraction (nd) between the base material 2 and the light-shielding film 3 can be 0.0 or more and 0.2 or less for reducing the internal reflection.

The inorganic fine particles can have an index of refraction (nd) of 2.2 or more. The inorganic fine particles preferably have a number-average particle diameter of 5 nm or more and 1000 nm or less and more preferably 10 nm or more and 100 nm or less. A number-average particle diameter of smaller than 5 nm reduces the stability of the light-shielding paint and increases the viscosity to readily cause gelation. If the number-average particle diameter of the inorganic fine particles is larger than 1000 nm, the effect of suppressing the occurrence of white spots on the light-shielding film is decreased.

The use of inorganic fine particles having an index of refraction (nd) of 2.2 or more can increase the index of refraction of the resulting light-shielding film 3 and is therefore effective in reduction of the internal reflection. As the inorganic fine particles having an index of refraction (nd) of 2.2 or more, for example, titanium oxide, zirconium oxide, aluminum oxide, yttrium oxide, cadmium oxide, diamond, strontium titanate, and germanium fine particles can be used. Among these materials, titanium oxide and zirconium oxide, which have an index of refraction (rid) of 2.2 or more and 3.5 or less, can be particularly used. If the inorganic fine particles have an index of refraction of less than 2.2, the light-shielding film has a low index of refraction, which increases the difference of the index of refraction between the base material and the light-shielding film and reduces the effect of suppressing internal reflection.

The content of the inorganic fine particles in the light-shielding film 3 of the present invention is preferably 5.0 mass % or more and 40.0 mass % or less and more preferably 10.0 mass % or more and 15.0 mass % or less. If the content of the inorganic fine particles in the light-shielding film 3 is less than 5.0 mass % the increase in the index of refraction is small, and the internal reflection increases. If the content of the inorganic fine particles in the light-shielding film 3 is higher than 40.0 mass %, the sticking three and the durability of a coated film disadvantageously decrease.

The light-shielding film 3 can contain an amine curing agent for curing the epoxy resin. Examples of the amine curing agent include linear aliphatic, polyimide, alicyclic, aromatic, and other dicyandiamides; and adipic dihydrazide. These curing agents may be used alone or as a mixture of two or more thereof.

The content of the curing agent in the light-shielding film 3 can be 1.0 mass % or more and 25.0 mass % or less. A content of the curing agent of less than 1.0 mass % decreases the degree of cure of the light-shielding film and decreases the adhesion to the base material. A content of the curing agent is higher than 25.0 mass % decreases the optical characteristics.

The light-shielding film 3 may contain additives within a range that does not impair the intended purpose. The additives can be an antifungal agent and an oxidation inhibitor. The content of the additives in the light-shielding film 3 of the present invention is preferably 15.0 mass % or less and more preferably 10.0 mass % or less.

Protective Film Disposed on Light-Shielding Film

The optical element 1 of the present invention includes a protective film 4 on the light-shielding film 3. In the protective film, an alkyd resin and a melamine resin or benzoguanamine resin having two or more iminomethylol groups in a molecule are condensed.

The protective film 4 can be formed so as to cover the entire surface of the light-shielding film 3 for preventing the light-shielding film 3 from deteriorating in the step of forming an antireflection film and in use for a long time. The protective film 4 is required to have excellent performance, such as chemical resistance and water resistance, and to have sufficient hardness. The protective film 4 of the present invention is a cured film in which an alkyd resin and a melamine resin (benzoguanamine resin) having two or more iminomethylol groups in a molecule are condensed.

The alkyd resin is formed by condensation polymerization of fatty acid and polyhydric alcohol and has an ester structure in the main chain and is classified into long oil length, medium oil length, or short oil length from large to small based on the ratio of the fatty acid bonding to side chains. Among these alkyd resins, the alkyd resin can be a short oil length alkyd resin, in particular, from the viewpoint of rapid drying and excellent cold curing.

The melamine resin having two or more iminomethylol groups is, for example, an iminomethylol type methylol melamine. The methylol melamine is a compound having a triazine ring in which a part or all of hydrogen atoms are substituted with a methylol group and/or an iminomethylol group and is classified into a methylol type and an iminomethylol type based on the form. The melamine resin used in the protective film 4 of the present invention can be an iminomethylol type methylol melamine, and the hydroxyl group of the iminomethylol group may be substituted with an alkyl group, because the alkyd resin and the iminomethylol type methylol melamine form a cured film in the state shown in the following structural formula (1). As a result, a rigid cross-linked structure is formed, and its synergistic effect with the ester skeleton of the alkyd resin improves the film characteristics, such as chemical resistance and water resistance, even in a film fired at low temperature.

[Chem.1]

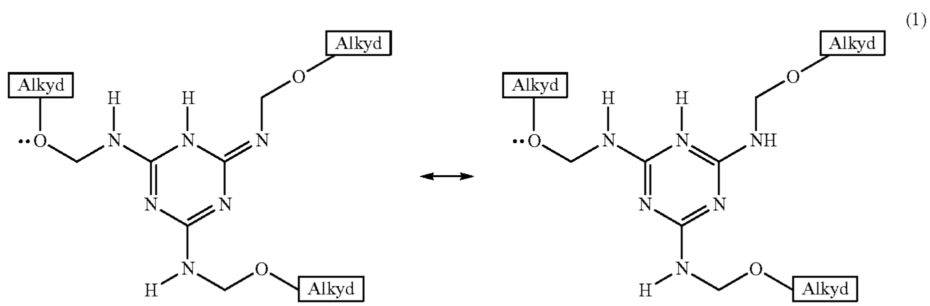

In order to enhance the reaction of the alkyd resin and the iminomethylol type methylol melamine, an acid catalyst may be used. A variety of acid catalysts can be used, and examples thereof include phosphoric acid, phosphonic acid, nitric acid, sulfonic acid, and acetic acid.

Antireflection Film

The optical element 1 of the present invention can include an antireflection film 5 in at least a part of the optically effective area 2*b*. The antireflection film 5 can be made of, for example, an inorganic material, such as zinc, aluminum, silicon, titania, or an oxide thereof; a metal fluoride, such as magnesium fluoride; or a resin.

The antireflection film 5 can be a film having an uneven structure on a surface due to crystals mainly composed of aluminum hydroxide or an aluminum oxide hydrate. Such a film has very high antireflection performance.

The antireflection film 5 should not be disposed on the protective film 4. If the antireflection film 5 is disposed on the protective film 4, the antireflection film 5 easily peels off from the base material 2.

Others

The optical element 1 of the present invention can further include films, in addition to the films described above, for proving a variety of functions. For example, the optical element may be provided with a hard coat layer for improving the film strength. Furthermore, a monolayer or multilayer film may be disposed between the base material 2 and the antireflection film 5 and/or between the base material 2 and the light-shielding film 3. As a result, the antireflection performance is further enhanced, and the adhesion between the base material and the film is enhanced.

Method of Producing Optical Element

Step of Forming Light-Shielding Film

The method of producing an optical element of the present invention includes a step of forming a light-shielding film 3 in at least a part of the periphery of a base material 2.

The light-shielding film 3 of the present invention is formed by curing a light-shielding paint that at least contains a colorant and a binder resin. The light-shielding paint of the present invention further contains an organic solvent and may contain a curing agent.

In the present invention, in order to adjust the thickness of the light-shielding film 3 or to improve the workability of coating, the concentration and the viscosity can be adjusted by further adding an organic solvent or an epoxy resin to the paint.

The light-shielding paint can be applied by any method, such as brush coating, spin coating, spray coating, or dip coating, according to the shape of the base material and the position of the optically non-effective area.

The light-shielding paint can be cured by thermal processing, but may be cured by any method giving a similar cured product. In the thermal processing, the heating conditions are selected depending on the type of the curing agent and the heat resistance of the base material. In a case of the light-shielding paint containing a curing agent, the heating temperature is preferably 60° C. or more and 200° C. or less, and more preferably 80° C. or more and 100° C. or less for maintaining the appearance quality of the light-shielding film 3. The heating time is preferably 30 minutes or more and 20 hours or less and more preferably 1 hour or more and 4 hours or less.

Step of Forming Protective Film on Surface of Light-Shielding Film

The method of producing an optical element of the present invention includes, after the step of forming the light-shielding film 3, a step of forming a protective film 4 on the light-shielding film 3 by applying a paint containing an alkyd resin and a melamine resin (or benzoguanamine resin) having two or more iminomethylol groups in a molecule to the surface of the light-shielding film 3.

The paint for the protective film 4 contains an alkyd resin having an ester bond and a hydroxyl group in a molecule and a melamine resin (benzoguanamine resin) having two or more iminomethylol groups in a molecule and functioning as a cross-linker. The alkyd resin and the melamine resin (hereinafter, also referred to as cross-linker) having two or more methylol groups in a molecule can be liquid at ordinary temperature. Commercially available examples of the alkyd resin include BECKOSOL (manufactured by DIC Corporation), ARAKYD (manufactured by Arakawa Chemical industries, Ltd.), and TENAKYD (manufactured by AS RESIN). As the cross-linker having two or more iminomethylol groups, a methylol melamine resin (manufactured by Sanwa Chemical Co., Ltd.) can be used.

The paint including an alkyd resin and a cross-linker having iminomethylol groups can be applied by a method, such as brush coating, spin coating, spray coating, or dip coating, according to the shape of the base material and the position of the optically non-effective area.

The method of producing an optical element of the present invention can include, after the step of applying a paint containing an alkyd resin and a melamine resin having iminomethylol groups, a step of curing the paint to form a protective film 4 on the light-shielding film 3. Specifically, the protective film 4 is formed by curing a mixture of the alkyd resin, the melamine resin having iminomethylol groups, and a curing agent.

The paint containing an alkyd resin and a cross-linker having iminomethylol groups can be cured by thermal processing, but may be cured by any method giving a similar cured product. In the thermal processing, the heating conditions are selected depending on the types of the alkyd resin and the cross-linker having iminomethylol groups and the heat resistance of the base material. The heating is preferably carried out at 40° C. or more and 100° C. or less and more preferably at 60° C. or more and 90° C. or less.

Step of Forming Antireflection Film

The method of producing an optical element of the present invention can include, after the formation of the protective film 4 by applying the paint containing an alkyd resin and a cross-linker, a step of forming an antireflection film 5 on the base material 2. In the step of forming an antireflection film 5, for example, a liquid-phase method, i.e., a process involving heating in the air or a process under a high-humidity environment, such as dipping in warm water, can be employed.

In the step of forming an antireflection film, a paint for an antireflection film is applied to at least a part of the optically effective areas 2*a* and 2*b* of the base material 2 to form an antireflection film 5. The paint for an antireflection film can be applied by a method, such as spin coating, spray coating, or dip coating. The paint may be ununiformly applied to a part of the already formed light-shielding film 3 and protective film 4. In order to exhibit the function as an antireflection film by using the material for forming an antireflection film, a layer having an adjusted index of refraction or an uneven structure is formed on the surface of the base material.

A layer having an adjusted index of refraction can be formed by, for example, applying a material having a low index of refraction, such as magnesium fluoride, in a fine particle form or hollow particles of silicon oxide.

An antireflection film 5 having an uneven structure can be formed on the surface of the base material by, for example, applying an application material for an antireflection film containing aluminum oxide or aluminum to the surface of the base material, heating the coated film for fixing, and then immersing the film in warm water, exposing the film to water vapor, or bringing the film into contact with warm water. The applied material can be heated at 100° C. or more and 220° C. or less for 5 minutes or more and 24 hours or less. The temperature of the warm water can be 40° C. or more and 100° C. or less, and the time of contacting with the warm water can be 5 minutes or more and 24 hours or less. The aluminum component contained in the film reacts and dissolves or precipitates by the immersion in warm water, the exposure to water vapor, or the contact with warm water. As a result, an uneven structure due to crystals mainly composed of aluminum oxide, aluminum hydroxide, or aluminum oxide hydrate is formed on the surface. The crystals are plate-like crystals and can be particularly boehmite. The end portions of these plate-like crystals form fine irregularities. Accordingly, in order to increase the height of the fine irregularities and to narrow the intervals, the plate-like crystals are selectively arranged at a specific angle to the surface of the base material. Since this uneven structure continuously increases the index of refraction from the air interface toward the base material, very high antireflection performance is exhibited.

In the method of producing an optical element of the present invention, since the protective film 4 in which the alkyd resin having excellent water resistance and the cross-linker are cured is disposed on the light-shielding film 3, a change in the color tone of the light-shielding film 3 hardly occurs during the process of forming the antireflection film 5.

In the method of producing an optical element of the present invention, after the step of forming a film on the surface of the light-shielding film and before the step of forming an antireflection film, the base material 2 may be washed with an alkaline solution.

EXAMPLES

The present invention will now be specifically described by examples, but is not limited to the following examples.

In the following Examples and Comparative Examples, measurements and evaluations were performed by the following methods.

Solvent Resistance of Film

The solvent resistance of a film was evaluated by the amount of eluted dye in a solvent. The method of measuring the amount of eluted dye will now be described.

Samples for measurement were each prepared by forming a light-shielding film 3 and a protective film 4 according to Examples and Comparative Examples on a monitor glass having a diameter of 30 mm and a thickness of 1 mm. Each monitor glass provided with a light-shielding film 3 and a protective film 4 was immersed in 10 mL of cyclopentanone for 10 minutes to prepare "cyclopentanone solution of eluted dye" from the light-shielding film 3 and the protective film 4.

Subsequently, a 1 ppm cyclopentanone solution of each dye (four types: black, red, yellow, and blue) contained in the light-shielding paint was prepared and was subjected to measurement of absorbance with a spectrometer. The absorbance measurement was performed under the following conditions:

Sample: cyclopentanone eluate (using a 10 mm cell manufactured by PS)

Measuring apparatus: fiber-type spectrometer HR4000 manufactured by Ocean Optics, Inc.

Measurement wavelength: 200 to 1100 nm (analytical wavelength: 430 to 700 nm)

The absorbance of each "cyclopentanone solution of eluted dye" prepared above was then measured with a spectrometer, and waveform analysis was performed.

Dye concentrations ($a_{Black}$, $a_{Red}$, $a_{Yellow}$, and $a_{Blue}$) satisfying the following Expression (2) were calculated using the solver function, and the sum ($a_{total}$) thereof was defined as the total amount of eluted dyes in the "cyclopentanone solution of eluted dye".

$$A_{calc}(\lambda)=a_{black}*A_{black}(\lambda)+a_{red}*A_{red}(\Delta)+a_{yellow}*A_{yellow}(\lambda)+a_{blue}*A_{blue}(\lambda) \quad \text{(Expression 1)}$$

$$\text{Min } \Sigma\{Aex(\lambda)-A_{calc}(\lambda)\}^2 \text{(least-squares)} \quad \text{(Expression 2)}$$

$$a_{total}=a_{black}+a_{red}+a_{yellow}+a_{blue} \quad \text{(Expression 3)}$$

$A_{calc}$: calculated absorbance of eluate
Aex: measured absorbance of eluate
$A_{color}$: measured absorbance of dye
$a_{Total}$: total concentration (ppm) of dyes in eluate
$a_{color}$: concentration (ppm) of each dye in eluate
λ: wavelength (430 to 700 nm)

The thus-obtained value of the total amount of eluted dyes in the "cyclopentanone solution of eluted dye" was evaluated by the following criteria:

A: 0.2 ppm or less (almost no coloration due to elution is visually observed),

B: 0.2 ppm or more and 1.0 ppm or less (slight coloration due to elution is visually observed), and C: 1.0 ppm or more (clear coloration due to elution is visually observed).

Appearance Evaluation after Reliability Test at High Temperature and High Humidity Lenses produced in Examples were subjected to a reliability test at high temperature and high humidity by leaving the lenses in an environment where the temperature was 60° C. and the humidity was 90% for 1000 hours, and the appearance of each light-shielding film was evaluated by viewing from the optically effective area 2*a* side.

The appearance was evaluated from two aspects: "color tone" and "number of white spots". Methods of evaluating the "color tone" and the "number of white spots" will now be described.

Method of Evaluating Color Tone

In a lens provided with a light-shielding film 3 and a protective film 4, the adhesion interface between the light-shielding film 3 and the base material was photographed from the optically effective area 2*a* side with CANON single-lens reflex camera EOS70D. The resulting photograph was incorporated into image analysis software Image J, and a range of 15 $mm^2$ in an appropriate area corresponding to the optically non-effective area 2*c* and not having dust and dirt was cut out. The cut-out image was subjected to binarization to obtain a brightness value. The thus-obtained value was defined as "color tone". A large value (near 255) means bad color tone. The appearance was evaluated based on the color tone by the following criteria:

A: a color tone of 0 or more and not higher than 50,

B: a color tone of higher than 50 and not higher than 80, and

C: a color tone of higher than 80 and not higher than 255.

Method of Evaluating Number of White Spot

In a lens provided with a light-shielding film 3 and a protective film 4, the adhesion interface between the light-shielding film 3 and the base material was photographed from the optically effective area 2*a* side with CANON single-lens reflex camera EOS70D. The resulting photograph was incorporated into image analysis software Image J, and a range of 15 $mm^2$ in an appropriate area corresponding to the optically non-effective area 2*c* and not having dust and dirt was cut out. The cut-out image was subjected to binarization, and white spots having a value of 128 or more were counted. The appearance was evaluated based on the number of the white spots by the following criteria:

A: the number of white spots is 0 or more and not larger than 200,

B: the number of white spots is larger than 200 and not larger than 500, and

C: the number of white spots is larger than 500.

Example 1

In Example 1, a lens for evaluating solvent resistance was produced using a monitor glass (manufactured by Ohara Inc., S-LAH55V) as the base material, and a lens for evaluating the appearance after a reliability test was produced using an optical glass (manufactured by Ohara Inc., S-LAH55V) as the base material.

In a monitor glass, a paint (manufactured by Canon Chemicals Inc., GT-7) for a light-shielding film was applied, followed by rotating with a spin coater at 1000 rpm for 10 seconds and at 2000 rpm for 20 seconds to produce a sample for evaluation. In a lens, as shown in FIG. 2A, a light-shielding paint (manufactured by Canon Chemicals Inc., GT-17) was applied to the optically non-effective area of a lens. The lens was placed on the turntable 6*a* shown in FIG. 2A, and the paint for a light-shielding film was applied to the lens with a brush 7*a* while slowly rotating the turntable. After the application, both the monitor glass and the lens were dried at room temperature for 2 hours and were then heated at 80° C. for 3 hours to form each light-shielding film 3.

A paint for a protective film 4 to be disposed on the surface of the light-shielding film was prepared as follows: 21.45 g of a short oil length alkyd resin (manufactured by DIC Corporation, product name: Beckosol EZ-3509-PR) having an oil length (content of fatty acid) of 35% and an acid value of 3.4 was dissolved in 17.55 g of 1-propoxy-2-propanol at room temperature. To this resin solution was added 7.29 g of a solution of an iminomethylol type methylol melamine resin (manufactured by Sanwa Chemical Co., Ltd., product name: Nikarack MX-706) containing 70% non-volatile content and having a weight-average degree of polymerization of 2.6. The mixture was sufficiently stirred to give a uniform mixture. Separately, 0.36 g of phosphonic acid was dissolved in 0.36 g of 1-ethoxy-2-propanol to prepare an acid catalyst solution. This acid catalyst solution (0.72 g) was added to the mixture solution (46.2.9 g) of the alkyd resin and the methylol melamine resin solution, and the mixture was mixed by stirring. The resulting solution was used as a paint for a protective film 4 to be disposed on the surface of the light-shielding film.

In a monitor glass, a paint (manufactured by Canon Chemicals Inc., GT-7) for a light-shielding film was applied, followed by rotating with a spin coater at 500 rpm for 5 seconds and at 2000 rpm for 20 seconds to produce a sample for evaluation. In a lens, as shown in FIG. 2B, a lens provided with the light-shielding film 3 was placed on the turntable 6*b*, and a material for forming a film to be disposed on the surface of the light-shielding film was applied to the lens with a brush 7*b* while slowly rotating the turntable. On this occasion, the material for forming a film to be disposed on the surface of the light-shielding film was applied so as to cover the entire surface of the light-shielding film. After the application, drying at room temperature for 1 hour and then heating at 100° C. for 3 hours were carried out to form a protective film 4 on the surface of the light-shielding film 3.

The monitor glass and the lens were washed with a detergent (manufactured by Matsumura Oil Co., Ltd., product name: OK309-C). The lens was subjecting to ultrasonic cleaning for 10 to 20 minutes in a state of being entirely immersed in pure water. Subsequently, the lens was exposed to hot air of 60° C. for 5 to 10 minutes for drying and then taken out.

The lens provided with the light-shielding film 3 and the protect film 4 on the light-shielding film 3 was placed on the turntable 6*c* shown in FIG. 2C. An application material containing aluminum oxide or aluminum was dropwise added to near the center of the concave face of the optically effective area 2*h*, and spin coating was carried out at 3000 rpm for 30 seconds. Subsequently, the lens was heated at 100° C. for 2 hours and was then, as shown in FIG. 2D, immersed in a warm water tank 8 controlled to 65° C. or more and 85° C. or less for 30 minutes. An antireflection film 5 having an uneven structure due to crystals mainly composed of aluminum hydroxide or aluminum oxide hydrate on the surface was thus formed on the optically effective area of the lens to prepare a lens shown in FIG. 2E.

The results of evaluation of the sample for solvent resistance evaluation and the lens produced in Example 1 are shown in Table 1.

Example 2

In Example 2, a protective film 4 was formed as in Example 1 except that a methylol melamine resin different from that used in Example 1 was used, i.e., the solution of the iminomethylol melamine resin (manufactured by Sanwa Chemical Co., Ltd., product name: Nikarack MX-706) in the paint for a protective film 4 was substituted with a solution of an iminomethylol type methylol melamine resin (manufactured by Sanwa Chemical Co., Ltd., product name: Nikarack MS-001) containing 60% non-volatile content and having a weight-average degree of polymerization of 5.7. A sample for solvent resistance evaluation and a lens were the prepared as in Example 1.

The results of evaluation of the sample for solvent resistance evaluation and the lens produced in Example 2 are shown in Table 1.

Example 3

In Example 3, a protective film 4 was formed as in Example 1 except that the solution of the methylol melamine resin (manufactured by Sanwa Chemical Co., Ltd., product name: Nikarack MX-706) in the paint for a protective film 4 was substituted with 5.15 g of bisphenol A in a tetramethylol form (manufactured by Asahi Yukizai Corporation, production name: TM-BIP-A). A sample for solvent resistance evaluation and a lens were then prepared as in Example 1.

The results of evaluation of the sample for solvent resistance evaluation and the lens produced in Example 3 are shown in Table 1.

Example 4

In Example 4, a protective film 4 was formed as in Example 1 except that the short oil length alkyd resin (manufactured by DIC Corporation, product name: Beckosol EZ-3509-PR) in the paint for a protective film 4 was substituted with a short oil length alkyd resin (manufactured by DIC Corporation, product name: Beckosol EZ-3065P) having an oil length (content of fatty acid) of 30% and an acid value of 13. A sample for solvent resistance evaluation and a lens provided with an antireflection film 5 in the optically effective area were then prepared as in Example 1.

The results of evaluation of the sample for solvent resistance evaluation and the lens produced in Example 4 are shown in Table 1.

Example 5

In Example 5, a protective film 4 was formed as in Example 1 except that the alkyd resin (manufactured by INC Corporation, product name: Beckosol EZ-3509-PR) in the paint for a protective film 4 was substituted with an alkyd resin (manufactured by DIC Corporation, product name: Beckosol EZ-3801-60). A sample for solvent resistance evaluation and a lens were then prepared as in Example 1.

The results of evaluation of the sample for solvent resistance evaluation and the lens produced in Example 5 are shown in Table 1.

Example 6

In Example 6, the paint for a light-shielding film used in Example 1 was substituted as follows.

The main agent of the paint for a light-shielding film will now be described. The main agent was prepared by dispersing 42.9 g of propylene glycol monomethyl ether and a dispersant, 14.3 g of inorganic fine particles having an index of refraction (nd) of 2.2 or more, with a bead mill (manufactured by Hiroshima Metal & Machinery Co., Ltd., product name: Ultra Apex Mill) using beads having a diameter of 50 μm to prepare 57.2 g of slurry of inorganic fine particles having a number-average particle diameter of 20 nm. Subsequently, the slurry (57.2 g) prepared with the bead mill, 21 g of epoxy resin A, 1 g of a coupling agent, 13 g of a colorant, and 40 g of propylene glycol monomethyl ether were weighed and were put in a ball mill pot. Five magnetic balls having a diameter of 20 mm were then put in the ball mill pot. The inorganic fine particles having an index of refraction (nd) of 2.2 or more were titanium oxide particles (manufactured by Tayca Corporation, product name: MT-05). The epoxy resin A was a polycondensate of 4,4'-isopropylidene diphenol and 1-chloro-2,3-epoxypropane (manufactured by Mitsubishi Chemical Corporation, product name: Epicoat 828). The coupling agent was an epoxy silane coupling agent (manufactured by Shin-Etsu Silicone Co., Ltd., product name: KBM403). The ball mill pot containing the blended paint and the magnetic balls was set to a roll coater, followed by stilling for 48 hours to prepare the main agent of a paint for a light-shielding film.

The dye used was a mixture of a black dye, a red dye, a yellow dye, and a blue dye.

The black dye was VALIFAST BLACK 1821 manufactured by Orient Chemical Industries Co., Ltd. The red dye was VALIFAST RED 3320 manufactured by Orient Chemical Industries Co., Ltd. The yellow dye was OIL YELLOW 129 and VALIFAST YELLOW 3108 manufactured by Orient Chemical Industries Co., Ltd. The blue dye was VALIFAST BLUE 1605 manufactured by Orient Chemical Industries Co., Ltd.

Subsequently, 1.9 g of amine curing agent A and 1 g of curing catalyst A were added to the main agent (132.2 g) of the paint for a light-shielding film, and the mixture was stirred with a roll coater for 30 minutes. The amine curing agent A was an aliphatic amine curing agent, Adeka Hardener EH6019 (product name) manufactured by Adeka Corporation. The curing catalyst A was 2,4,6-tris(diaminomethyl)phenol. A sample for solvent resistance evaluation and a lens were prepared as in Example 1 except that the thus-prepared paint was used as the paint for a light-shielding film.

The results of evaluation of the sample for solvent resistance evaluation and the lens produced in Example 6 are shown in Table 1.

Example 7

In Example 7, a sample for solvent resistance evaluation and a lens were prepared as in Example 1 except that the temperature heating the protective film 4 disposed on the surface of the light-shielding film was changed from 80° C. in Example 1 to 40° C.

The results of evaluation of the sample for solvent resistance evaluation and the lens produced in Example 7 are shown in Table 1.

Example 8

In Example 8, a sample for solvent resistance evaluation and a lens were prepared as in Example 1 except that the temperature heating the protective film 4 disposed on the surface of the light-shielding film was changed from 80° C. in Example 1 to 100° C.

The results of evaluation of the sample for solvent resistance evaluation and the lens produced in Example 8 are shown in Table 1.

Comparative Example 1

In Comparative Example 1, a sample for solvent resistance evaluation and a lens were prepared as in Example 1 except that after the formation of a light-shielding film 3 as in Example 1, the protective film was not disposed on the surface of the light-shielding film.

The results of evaluation of the sample for solvent resistance evaluation and the lens produced in Comparative Example 1 are shown in Table 1.

Comparative Example 2

In Comparative Example 2, the paint for a protective film to be disposed on the surface of the light-shielding film was prepared as follows: 21.45 g of an alkyd resin (manufactured by DIC Corporation, product name: Beckosol EZ-3509-PR) was dissolved in 1.7.55 g of 1-propoxy-2-propanol at room temperature. Separately, 0.305 g of phosphonic acid was dissolved in 0.305 g of 1-ethoxy-2-propanol to prepare an acid catalyst solution. This acid catalyst solution (0.61 g) was added to the alkyd resin solution (39.00 g), and the mixture was mixed by stirring.

A sample for solvent resistance evaluation and a lens were prepared as in Example 1 except that the solution prepared above was used as a paint for a protective film to be disposed on the surface of the light-shielding film and the heating temperature after the application was 150° C.

The results of evaluation of the sample for solvent resistance evaluation and the lens produced in Comparative Example 2 are shown in Table 1.

Comparative Example 3

In Comparative Example 3, a sample for solvent resistance evaluation and a lens were prepared as in Comparative Example 2 except that the temperature heating the protective film disposed on the surface of the light-shielding film was changed from 150° C. in Comparative Example 2 to 80° C.

The results of evaluation of the sample for solvent resistance evaluation and the lens produced in Comparative Example 3 are shown in Table 1.

Comparative Example 4

In Comparative Example 4, a sample for solvent resistance evaluation and a lens were prepared as in Comparative Example 2 except that the 21.45 g of the alkyd resin was substituted with 7.29 g of a solution of a methylol melamine resin (manufactured by Sanwa Chemical Co., Ltd., product name: Nikarack MX-706).

The results of evaluation of the sample for solvent resistance evaluation and the lens produced in Comparative Example 4 are shown in Table 1.

Comparative Example 5

In Comparative Example 5, a sample for solvent resistance evaluation and a lens were prepared as in Comparative Example 4 except that the temperature heating the protective film 4 disposed on the surface of the light-shielding film was changed from 150° C. in Comparative Example 4 to 80° C.

The results of evaluation of the sample for solvent resistance evaluation and the lens produced in Comparative Example 5 are shown in Table 1.

Comparative Example 6

In Comparative Example 6, a sample for solvent resistance evaluation and a lens were prepared as in Comparative Example 3 except that the 21.45 g of the alkyd resin in the paint for the protective film to be disposed on the surface of the light-shielding film was substituted with a triazine resin, i.e., 5.00 g of a triazine trisodium salt (manufactured by Sankyo Kasei Co., Ltd., product name: Santhiol N-W) having a triazine ring and not having an iminomethylol group.

The results of evaluation of the sample for solvent resistance evaluation and the lens produced in Comparative Example 6 are shown in Table 1.

TABLE 1

| | Protective film | | | Evaluation result | | |
|---|---|---|---|---|---|---|
| | | | | | Light-shielding film Appearance evaluation after reliability test | |
| | Material | | Firing temperature | Protective film Solvent | Color tone (numerical | White spot (numerical |
| | Resin | Cross-linker | [° C.] | resistance | value) | value) |
| Example 1 | Alkyd resin | Iminomethylol melamine | 80 | A (0.02) | A (32) | A (109) |
| Example 2 | Alkyd resin | Iminomethylol melamine | 80 | A (0.05) | A (38) | A (152) |
| Example 3 | Alkyd resin | Tetramethylol type of bisphenol A | 80 | A (0.06) | A (43) | A (148) |
| Example 4 | Alkyd resin | Iminomethylol melamine | 80 | A (0.03) | A (39) | A (173) |

TABLE 1-continued

| | Protective film | | | Evaluation result | | |
|---|---|---|---|---|---|---|
| | Material | | | | Light-shielding film Appearance evaluation after reliability test | |
| | Resin | Cross-linker | Firing temperature [° C.] | Protective film Solvent resistance | Color tone (numerical value) | White spot (numerical value) |
| Example 5 | Alkyd resin | Iminomethylol melamine | 80 | A (0.02) | A (47) | A (154) |
| Example 6 | Alkyd resin | Iminomethylol melamine | 80 | A (0.09) | A (29) | A (121) |
| Example 7 | Alkyd resin | Iminomethylol melamine | 40 | A (0.18) | A (30) | A (187) |
| Example 8 | Alkyd resin | Iminomethylol melamine | 100 | A (0.02) | A (48) | A (124) |
| Comparative Example 1 | — | — | — | — | B (78) | C (1005) |
| Comparative Example 2 | Alkyd resin | — | 150 | A | C (91) | A (189) |
| Comparative Example 3 | Alkyd resin | — | 80 | B | A (45) | B (315) |
| Comparative Example 4 | Methylol melamine resin | — | 80 | B | A (41) | B (227) |
| Comparative Example 5 | Methylol melamine resin | — | 150 | A (0.12) | C (127) | A (176) |
| Comparative Example 6 | Triazine resin | — | 80 | B | A (47) | C (912) |

Evaluation

It was demonstrated by Examples 1 to 8 that an optical element provided with a protective film containing an alkyd resin and a cross-linker having iminomethylol groups on a light-shielding film has high solvent resistance even if curing is performed at low temperature and hardly causes a change in the color tone and occurrence of white spots in the light-shielding film after a high-temperature and high-humidity reliability test.

The optical element of the present invention can be used as an optical element such as a lens and in optical systems and optical apparatuses including the optical elements.

The present invention can provide an optical element having high solvent resistance and water resistance and maintaining good appearance even in use for a long tune at a high-temperature and high-humidity environment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091575, filed Apr. 28, 2016, which is hereby incorporated by reference herein in its entirety.

The invention claimed is:

1. An optical element comprising:

a base material; and a light-shielding film disposed in at least a part of a periphery of the base material, wherein a film in which an alkyd resin and a melamine resin having two or more iminomethylol groups in a molecule are condensed or in which an alkyd resin and a benzoguanamine resin having two or more iminomethylol groups in a molecule are condensed is disposed on a surface of the light-shielding film.

2. The optical element according to claim 1, wherein the alkyd resin is a short oil length alkyd resin.

3. The optical element according to claim 1, wherein the base material is glass.

4. The optical element according to claim 3, wherein the optical element is a lens or a prism.

5. The optical element according to claim 4, wherein the base material includes an optically effective area and an optically non-effective area; and an antireflection film is disposed in at least a part of the optically effective area.

6. The optical element according to claim 5, wherein the antireflection film is formed by a liquid-phase method.

7. The optical element according to claim 5, wherein the antireflection film has an uneven structure due to crystals mainly composed of aluminum hydroxide or aluminum oxide hydrate on the surface.

8. The optical element according to claim 7, wherein the antireflection film is disposed in at least a part of the optically effective area and is not disposed on the surface of the film in which an alkyd resin and a melamine resin or benzoguanamine resin having two or more iminomethylol groups in a molecule are condensed.

9. A method of producing an optical element, comprising:

applying a light-shielding paint containing a colorant and a binder resin to a periphery of a base material and then firing the paint at 40° C. or more and 100° C. or less to form a light-shielding film;

applying a paint containing an alkyd resin and a melamine resin having two or more iminomethylol groups in a molecule or containing an alkyd resin and a benzoguanamine resin having two or more iminomethylol groups in a molecule to the surface of the light-shielding film and then firing the paint at 40° C. or more and 100° C. or less to form a protective film; and providing an antireflection film to the base material after the formation of the protective film.

10. The method of producing an optical element according to claim 9, wherein the alkyd resin is a short oil length alkyd resin.

11. The method of producing an optical element according to claim 9, wherein the base material is glass.

12. The method of producing an optical element according to claim 11, wherein the optical element is a lens or a prism.

13. The method of producing an optical element according to claim 9, wherein the antireflection film is formed by forming a film of aluminum oxide and bringing the aluminum oxide film into contact with water of 40° C. or more and 100° C. or less to form an uneven structure on the surface due to crystals mainly composed of aluminum hydroxide or aluminum oxide hydrate.

* * * * *